United States Patent
Li

(10) Patent No.: US 10,642,522 B2
(45) Date of Patent: May 5, 2020

(54) METHOD AND SYSTEM FOR IN-LINE DEDUPLICATION IN A STORAGE DRIVE BASED ON A NON-COLLISION HASH

(71) Applicant: Alibaba Group Holding Limited, George Town, Grand Cayman (KY)

(72) Inventor: Shu Li, Bothell, WA (US)

(73) Assignee: Alibaba Group Holding Limited, George Town (KY)

(*) Notice: Subject to any disclaimer, the term of this patent is extended or adjusted under 35 U.S.C. 154(b) by 316 days.

(21) Appl. No.: 15/706,351

(22) Filed: Sep. 15, 2017

(65) Prior Publication Data

US 2019/0087115 A1 Mar. 21, 2019

(51) Int. Cl.
| | |
|---|---|
| *G06F 3/06* | (2006.01) |
| *G06F 11/14* | (2006.01) |
| *G06F 16/13* | (2019.01) |
| *G06F 16/23* | (2019.01) |
| *G06F 16/174* | (2019.01) |

(52) U.S. Cl.
CPC ............ *G06F 3/0641* (2013.01); *G06F 3/067* (2013.01); *G06F 3/0608* (2013.01); *G06F 11/1453* (2013.01); *G06F 16/137* (2019.01); *G06F 16/174* (2019.01); *G06F 16/2308* (2019.01); *G06F 16/1752* (2019.01)

(58) Field of Classification Search
CPC .. G06F 3/0641; G06F 11/1453; G06F 16/137; G06F 16/2308; G06F 16/1752; G06F 3/0608; G06F 3/067; G06F 16/174
USPC .......................................................... 707/692
See application file for complete search history.

(56) References Cited

U.S. PATENT DOCUMENTS

| | | | |
|---|---|---|---|
| 4,775,932 | A | 10/1988 | Oxley |
| 6,226,650 | B1 | 5/2001 | Mahajan et al. |
| 7,565,454 | B2 | 7/2009 | Zuberi |
| 8,260,924 | B2 | 9/2012 | Koretz |
| 8,452,819 | B1 | 5/2013 | Sorenson, III |
| 8,516,284 | B2 | 8/2013 | Chan |

(Continued)

FOREIGN PATENT DOCUMENTS

WO 1994018634 8/1994

OTHER PUBLICATIONS

Tsuchiya, Yoshihiro, et al., "DBLK: Deduplication for Primary Block Storage", MSST 2011, Denver, CO, May 23-27, 2011, pp. 1-5.*

(Continued)

*Primary Examiner* — Robert Stevens
(74) *Attorney, Agent, or Firm* — Shun Yao; Park, Vaughan, Fleming & Dowler LLP

(57) ABSTRACT

One embodiment facilitates in-line deduplication in a storage device. During operation, the system receives, by a controller of the storage device, data to be stored. The system generates a key for the data based on a hash associated with the data. The system stores the key in a first data structure based on a logical block address of the data. In response to determining that an entry corresponding to the key exists in a second data structure, wherein the entry indicates a physical block address at which the data is stored, the system modifies metadata associated with the key and the logical block address, thereby facilitating the storage device to determine duplicate data and store the duplicate data at only one location on the storage device.

18 Claims, 9 Drawing Sheets

(56) References Cited

U.S. PATENT DOCUMENTS

| | | | |
|---|---|---|---|
| 8,751,763 B1* | 6/2014 | Ramarao | G06F 16/1752 711/162 |
| 8,825,937 B2 | 9/2014 | Atkisson | |
| 9,043,545 B2 | 5/2015 | Kimmel | |
| 9,088,300 B1 | 7/2015 | Chen | |
| 9,092,223 B1 | 7/2015 | Pani | |
| 9,280,472 B1 | 3/2016 | Dang | |
| 9,280,487 B2* | 3/2016 | Candelaria | G06F 12/0864 |
| 9,529,601 B1 | 12/2016 | Dharmadhikari | |
| 9,588,698 B1 | 3/2017 | Karamcheti | |
| 9,588,977 B1 | 3/2017 | Wang | |
| 1,001,316 A1 | 7/2018 | Fisher | |
| 10,013,169 B2* | 7/2018 | Fisher | G06F 3/0608 |
| 2002/0010783 A1 | 1/2002 | Primak | |
| 2002/0073358 A1 | 6/2002 | Atkinson | |
| 2002/0161890 A1 | 10/2002 | Chen | |
| 2003/0163594 A1 | 8/2003 | Aasheim | |
| 2003/0163633 A1 | 8/2003 | Aasheim | |
| 2004/0010545 A1 | 1/2004 | Pandya | |
| 2004/0255171 A1 | 12/2004 | Zimmer | |
| 2004/0268278 A1 | 12/2004 | Hoberman | |
| 2005/0038954 A1 | 2/2005 | Saliba | |
| 2005/0097126 A1 | 5/2005 | Cabrera | |
| 2005/0177755 A1 | 8/2005 | Fung | |
| 2005/0195635 A1 | 9/2005 | Conley | |
| 2005/0235067 A1 | 10/2005 | Creta | |
| 2005/0235171 A1 | 10/2005 | Igari | |
| 2006/0156012 A1 | 7/2006 | Beeson | |
| 2007/0033323 A1 | 2/2007 | Gorobets | |
| 2007/0101096 A1 | 5/2007 | Gorobets | |
| 2008/0034154 A1 | 2/2008 | Lee | |
| 2009/0113219 A1 | 4/2009 | Aharonov | |
| 2009/0282275 A1 | 11/2009 | Yermalayeu | |
| 2009/0307249 A1 | 12/2009 | Koifman | |
| 2009/0310412 A1 | 12/2009 | Jang | |
| 2010/0169470 A1 | 7/2010 | Takashige | |
| 2010/0229224 A1 | 9/2010 | Etchegoyen | |
| 2010/0325367 A1 | 12/2010 | Kornegay | |
| 2011/0055458 A1 | 3/2011 | Kuehne | |
| 2011/0153903 A1 | 6/2011 | Hinkle | |
| 2011/0218969 A1 | 9/2011 | Anglin | |
| 2011/0231598 A1 | 9/2011 | Hatsuda | |
| 2011/0292538 A1 | 12/2011 | Haga | |
| 2011/0302353 A1 | 12/2011 | Confalonieri | |
| 2012/0084523 A1 | 4/2012 | Littlefield | |
| 2012/0117399 A1 | 5/2012 | Chan | |
| 2012/0147021 A1 | 6/2012 | Cheng | |
| 2012/0159289 A1 | 6/2012 | Piccirillo | |
| 2012/0210095 A1 | 8/2012 | Nellans | |
| 2012/0246392 A1 | 9/2012 | Cheon | |
| 2012/0278579 A1 | 11/2012 | Goss | |
| 2012/0284587 A1 | 11/2012 | Yu | |
| 2013/0061029 A1 | 3/2013 | Huff | |
| 2013/0073798 A1 | 3/2013 | Kang | |
| 2013/0145085 A1 | 6/2013 | Yu | |
| 2013/0145089 A1 | 6/2013 | Eleftheriou | |
| 2013/0151759 A1* | 6/2013 | Shim | G06F 12/0246 711/103 |
| 2013/0159251 A1 | 6/2013 | Skrenta | |
| 2013/0166820 A1 | 6/2013 | Batwara | |
| 2013/0173845 A1 | 7/2013 | Aslam | |
| 2013/0219131 A1 | 8/2013 | Alexandron | |
| 2013/0318283 A1 | 11/2013 | Small | |
| 2014/0108414 A1 | 4/2014 | Stillerman | |
| 2014/0181532 A1 | 6/2014 | Camp | |
| 2014/0233950 A1 | 8/2014 | Luo | |
| 2014/0250259 A1 | 9/2014 | Ke | |
| 2014/0304452 A1 | 10/2014 | De La Iglesia | |
| 2014/0310574 A1 | 10/2014 | Yu | |
| 2014/0359229 A1 | 12/2014 | Cota-Robles | |
| 2014/0365707 A1 | 12/2014 | Talagala | |
| 2015/0019798 A1 | 1/2015 | Huang | |
| 2015/0082317 A1 | 3/2015 | You | |
| 2015/0106556 A1 | 4/2015 | Yu | |
| 2015/0106559 A1 | 4/2015 | Cho | |
| 2015/0142752 A1 | 5/2015 | Chennamsetty | |
| 2015/0227316 A1 | 8/2015 | Warfield | |
| 2015/0277937 A1 | 10/2015 | Swanson | |
| 2015/0304108 A1 | 10/2015 | Obukhov | |
| 2015/0363271 A1 | 12/2015 | Haustein | |
| 2015/0372597 A1 | 12/2015 | Luo | |
| 2016/0014039 A1 | 1/2016 | Reddy | |
| 2016/0098344 A1 | 4/2016 | Gorobets | |
| 2016/0110254 A1 | 4/2016 | Cronie | |
| 2016/0232103 A1 | 8/2016 | Schmisseur | |
| 2016/0239074 A1 | 8/2016 | Lee | |
| 2016/0239380 A1 | 8/2016 | Wideman | |
| 2016/0274636 A1 | 9/2016 | Kim | |
| 2016/0306853 A1* | 10/2016 | Sabaa | H04L 67/2842 |
| 2016/0343429 A1 | 11/2016 | Nieuwejaar | |
| 2016/0350002 A1 | 12/2016 | Vergis | |
| 2017/0075583 A1 | 3/2017 | Alexander | |
| 2017/0075594 A1 | 3/2017 | Badam | |
| 2017/0109232 A1 | 4/2017 | Cha | |
| 2017/0162235 A1 | 6/2017 | De | |
| 2017/0168986 A1 | 6/2017 | Sajeepa | |
| 2017/0212708 A1 | 7/2017 | Suhas | |
| 2017/0228157 A1 | 8/2017 | Yang | |
| 2017/0249162 A1 | 8/2017 | Tsirkin | |
| 2017/0262178 A1 | 9/2017 | Hashimoto | |
| 2017/0285976 A1 | 10/2017 | Durham | |
| 2017/0286311 A1 | 10/2017 | Juenemann | |
| 2017/0344470 A1 | 11/2017 | Yang | |
| 2017/0344491 A1 | 11/2017 | Pandurangan | |
| 2017/0353576 A1 | 12/2017 | Guim Bernat | |
| 2018/0024772 A1 | 1/2018 | Madraswala | |
| 2018/0088867 A1 | 3/2018 | Kaminaga | |
| 2018/0143780 A1* | 5/2018 | Cho | G06F 3/0679 |
| 2018/0167268 A1 | 6/2018 | Liguori | |
| 2018/0189182 A1 | 7/2018 | Wang | |
| 2018/0270110 A1 | 9/2018 | Chugtu | |
| 2018/0329776 A1 | 11/2018 | Lai | |
| 2018/0373428 A1 | 12/2018 | Kan | |
| 2019/0012111 A1 | 1/2019 | Li | |
| 2019/0073262 A1 | 3/2019 | Chen | |

OTHER PUBLICATIONS

Chen, Feng, et al., "CAFTL: A Content-Aware Flash Translation Layer Enhancing the Lifespan of Flash Memory based Solid State Devices", FAST '11, San Jose, CA, Feb. 15-17, 2011, pp. 1-14.*

Wu, Huijun, et al., "HPDedup: A Hybrid Prioritized Data Deduplication Mechanism for Primary Storage in the Cloud", Cornell Univ., arXiv:1702.08153v2 [cs.DC], Apr. 16, 2017, pp. 1-14.* https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India, 2017, <10.1145/3124680.3124741>, <hal-01654985>, 8 pages.

WOW: Wise Ordering for Writes—Combining Spatial and Temporal Locality in Non-Volatile Caches by Gill (Year: 2005), 14 pages.

Helen H. W. Chan et al. "HashKV: Enabling Efficient Updated in KV Storage via Hashing", https://www.usenix.org/conference/atc18/presentation/chan, (Year: 2018), 14 pages.

EMC Powerpath Load Balancing and Failover Comparison with native MPIO operating system solutions. Feb. 2011, 16 pages.

* cited by examiner

METHOD AND SYSTEM FOR IN-LINE DEDUPLICATION IN A STORAGE DRIVE BASED ON A NON-COLLISION HASH

BACKGROUND

Field

This disclosure is generally related to the field of data storage. More specifically, this disclosure is related to a method and system for in-line deduplication in a storage drive based on a non-collision hash.

Related Art

The proliferation of the Internet and e-commerce continues to create a vast amount of digital content. Distributed storage systems and servers have been created to access and store such digital content. In traditional storage devices (such as a hard disk drive (HDD) or a solid state drive (SSD)), the same data may be written multiple times because such traditional storage devices do not include a deduplication feature. When the same data block is repeatedly written into a drive, the same data is written into physical cells multiple times, which can result in a large write amplification factor. Ensuing challenges may include: wearing out of NAND flash in an SSD; high latency involved in communications and performing operations; and consumption of system resources (e.g., time and power) to write the duplicate data. Furthermore, as the capacity of HDDs and SSDs increases (e.g., above 8 terabytes), the local data written to a single drive also increases, resulting in an even higher likelihood of duplicate data.

One solution to address deduplication is for a CPU to calculate a hash key for a block of data, and search an existing key pool or library to determine whether the calculated hash key already exists (i.e., indicating that the specific block of data is duplicate data, and has already been written to storage). However, current methods used to search for the key may involve search algorithms which can take a long time, e.g., using a Bloom Filter or searching an entire library of keys using a B-tree. Furthermore, no efficient solution exists to perform in-line deduplication of data in a storage drive. Thus, while increased storage capacity in a storage device can provide useful benefits, the problem of removing duplicate data within the storage device remains unsolved.

SUMMARY

One embodiment facilitates in-line deduplication in a storage device. During operation, the system receives, by a controller of the storage device, data to be stored. The system generates a key for the data based on a hash associated with the data. The system stores the key in a first data structure based on a logical block address of the data. In response to determining that an entry corresponding to the key exists in a second data structure, wherein the entry indicates a physical block address at which the data is stored, the system modifies metadata associated with the key and the logical block address, thereby facilitating the storage device to determine duplicate data and store the duplicate data at only one location on the storage device.

In some embodiments, determining that the entry corresponding to the key exists in the second data structure involves: performing a search in the second data structure, based on the key as an index, for the entry which indicates the physical block address at which the data is stored.

In some embodiments, in response to determining that an entry corresponding to the key does not exist in the second data structure, the system: assigns a new physical block address to the key; stores, in the second data structure, a mapping of the key to the new physical block address; and writes the data to a physical media of the storage device based on the new physical block address.

In some embodiments, prior to writing the data to the location based on the new physical block address, the system processes the data by: compressing the data; encrypting the compressed data based on the key; and encoding the encrypted data based on an error correction code.

In some embodiments, assigning the new physical block address is performed by one or more of: a flash translation layer module of the storage device; and a mapping system of the storage device.

In some embodiments, entries in the first data structure are indexed by logical block addresses, and a respective entry in the first data structure indicates a corresponding key. Entries in the second data structure are indexed by keys, and a respective entry in the second data structure indicates a corresponding physical block address.

In some embodiments, the system receives, by the controller, a request to read the data. The system performs a search in the first data structure, based on the logical block address, for the key. The system performs a search in the second data structure, based on the key, for the physical block address associated with the data. The system reads the data from the storage device based on the physical block address. In response to determining that a hash of the read data does not match the key, the system generates an error report or message. In response to determining that the hash of the read data does match the key, the system returns the read data to a requesting application.

In some embodiments, subsequent to reading the data from the storage device based on the physical block address, the system processes the data by: decoding the read data based on an error correction code; decrypting the decoded data based on the key; and decompressing the decrypted data.

In some embodiments, the first data structure is stored in a first non-volatile memory of the storage device. The second data structure is stored in a second non-volatile memory of the storage device and loaded into a volatile memory of the storage device.

BRIEF DESCRIPTION OF THE FIGURES

In the figures, like reference numerals refer to the same figure elements.

DETAILED DESCRIPTION

Figure 1:
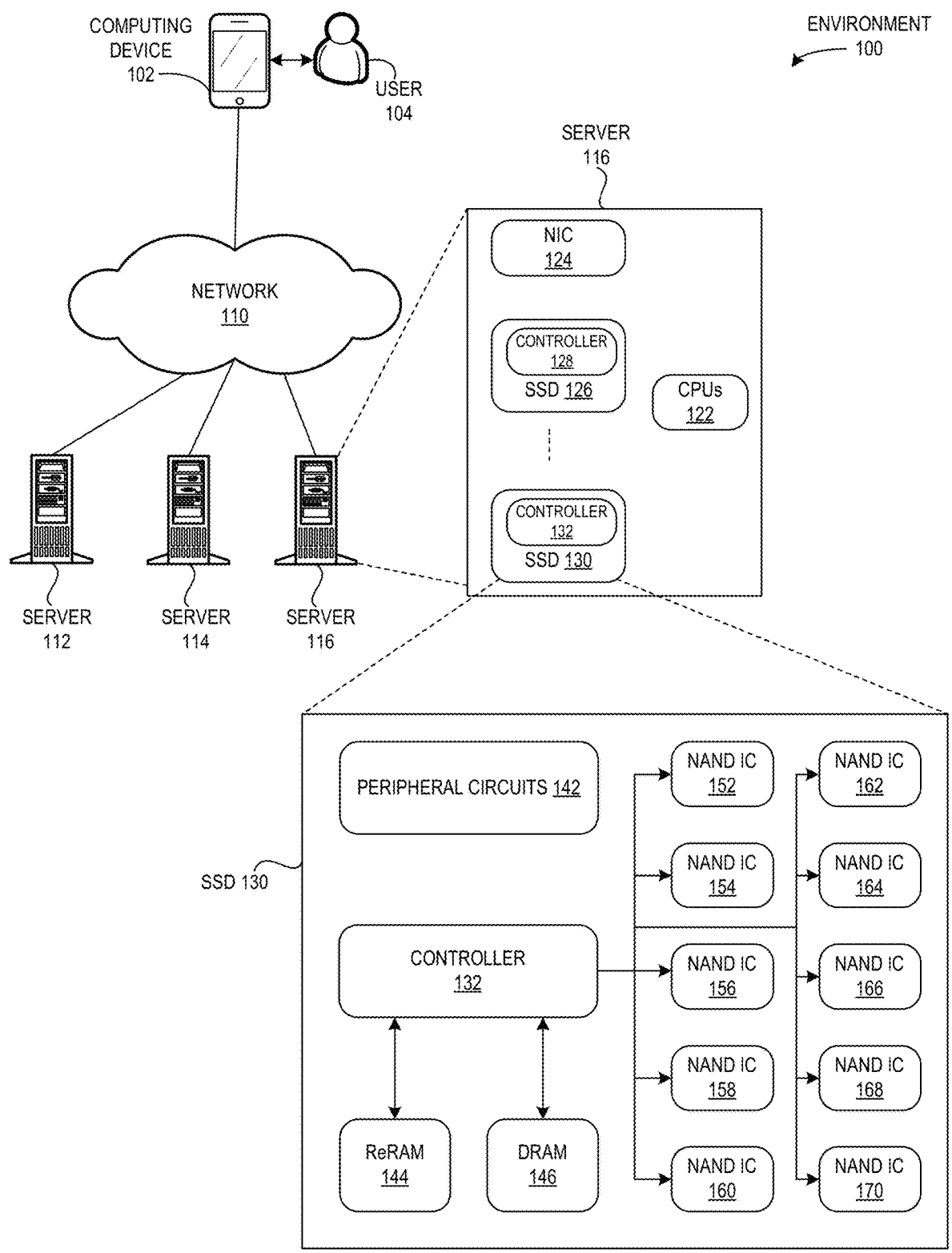
FIG. 1 illustrates an exemplary environment that facilitates in-line deduplication in a storage device, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein provide a system which solves the problem of providing in-line deduplication of data in a storage drive by using a non-collision hash and a two-step table lookup. When the same data block is repeatedly written into a drive, the same data is written into physical cells multiple times, which can result in a large write amplification factor. Ensuing challenges may include: wearing out of NAND flash in an SSD; high latency involved in communications and performing operations; and consumption of system resources (e.g., time and power) to write the duplicate data. Furthermore, as the capacity of HDDs and SSDs increases (e.g., above 8 terabytes), the local data written to a single drive also increases, resulting in an even higher likelihood of duplicate data. Traditional data deduplication methods may be performed outside a storage device itself (e.g., by a CPU), and may involve searching for a hash key in a large key pool or library based on a complex search algorithm, e.g., a Bloom Filter or a B-tree.

The embodiments described herein address these challenges by providing a system which facilitates in-line deduplication of data in a storage drive, based on a non-collision hash and two lookup tables. Given incoming data to be stored, the system calculates a hash key for the data and maps the key to the data's logical block address in a first table. Subsequently, the system performs a lookup in a second table for an entry corresponding to the key. If an entry is found, the entry can include a mapping of the key to a physical block address at which the data is already stored. In this case, the system need only modify metadata associated with the key and the logical block address. The system can thus avoid writing duplicate data to the storage device.

If an entry is not found in the second table, the system can assign a new physical block address to the key, and store a mapping of the key to the new physical block address in the second table. The system can subsequently write the data to a physical media of the storage device based on the new physical block address.

Thus, the embodiments described herein provide a system which increases the efficiency of a storage system. The increased efficiency can include an improved performance in latency for completion of I/O tasks, as well as an increased assurance for QoS. By using a two-step table lookup, the system provides a cost-efficient method for determining whether a hash key for incoming data exists, and, as a result, performing in-line deduplication of data. The system eliminates the need to implement a complex search algorithm for comparing hash keys. The system can free up physical locations which would otherwise be storing duplicate data, and can further reduce the physical wearing out of the physical media. Furthermore, this in-line deduplication of data can result in a lower latency for I/O operations. As a result, the embodiments described herein can provide an improved and more efficient storage system.

The term "storage server" or "storage system" refers to a server which can have multiple storage drives or storage devices, where data may be written to a drive or device for persistent storage.

The terms "storage-controlling module," "storage controller," and "controller" refer to a module or component located within a drive, and may be used interchangeably. In this disclosure, the storage controller can perform lookups in two separate tables.

The term "ECC-encoding" refers to encoding data based on an error correction code, while the term "ECC-decoding" refers to decoding data based on the error correction code. An "ECC-encoder/decoder" is a module which performs ECC-encoding/decoding.

Exemplary Environment

FIG. 1 illustrates an exemplary environment 100 that facilitates in-line deduplication in a storage device, in accordance with an embodiment of the present application. Environment 100 can include a computing device 102 which is associated with a user 104. Computing device 102 can include, for example, a tablet, a mobile phone, an electronic reader, a laptop computer, a desktop computer, or any other computing device. Computing device 102 can communicate via a network 110 with storage servers 112, 114, and 116 (which can be part of a distributed storage system). A storage server can include multiple storage drives, and each drive can include a controller and multiple physical media for data storage.

For example, storage server 116 can include components such as CPUs 122, a network interface card (NIC) 124, and multiple solid state drives (SSDs), such as SSD 126 with a controller 128 and SSD 130 with a controller 132. SSD 130 can include peripheral circuits 142 and controller 132, which can communicate with multiple physical storage media, such as NAND ICs 152-170. Controller 132 can also communicate with a resistive random access memory (ReRAM) 144 and a dynamic random access memory (DRAM) 146. ReRAM 144 can be a low-latency non-volatile memory used to store a first table (which includes the LBA to hash key mapping). DRAM 146 can be a volatile memory used to load a second table (which includes the hash key to PBA mapping) from the NAND flash for initialization. For example, DRAM 146 can buffer the PBA mapping information and synchronize the NAND flash on the fly.

User 104, via computing device 102, may wish to perform a task which involves writing data to or reading data from server 116. In-line deduplication of incoming data to be stored is described below in relation to FIGS. 3, 4, and 6, and an exemplary communication for a read request is described below in relation to FIGS. 4 and 7.

Figure 2:
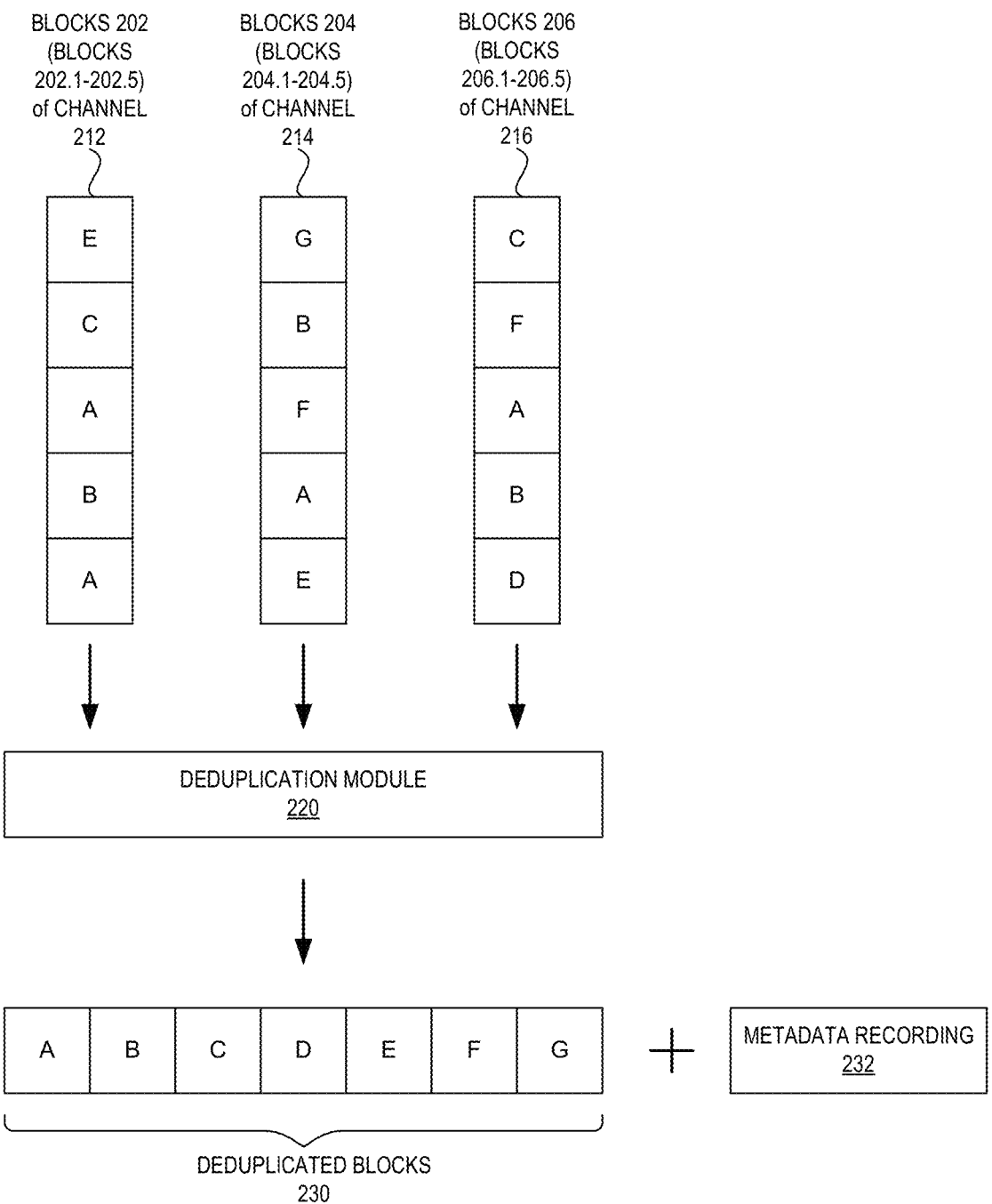
FIG. 2 illustrates deduplication of incoming data blocks in a storage device, in accordance with an embodiment of the present application.

FIG. 2 illustrates deduplication of incoming data blocks 202-206 in a storage device, in accordance with an embodiment of the present application. Data blocks 202, 204, and 206 can be incoming blocks on, respectively, channels 212, 214, and 216. Data blocks 202 can include blocks 202.1-202.5 with values corresponding to "{E, C, A, B, A}." Data blocks 204 can include blocks 204.1-204.5 with values corresponding to "{G, B, F, A, E}." Data blocks 206 can include blocks 206.1-206.5 with values corresponding to "{C, F, A, B, D}." Blocks 202-206 thus contain multiple duplicate blocks, and are processed by a deduplication module 220, which removes the duplicate blocks and tracks the repeat counts of unique blocks using metadata associated with the duplicate blocks. For example, deduplication module 220 can process blocks 202-206, which results in deduplicated blocks 230 with non-duplicate values corresponding to "{A, B, C, D, E, F, G})" and a metadata recording 232.

Addressing Data Blocks for Facilitating in-Line Deduplication

Figure 3:
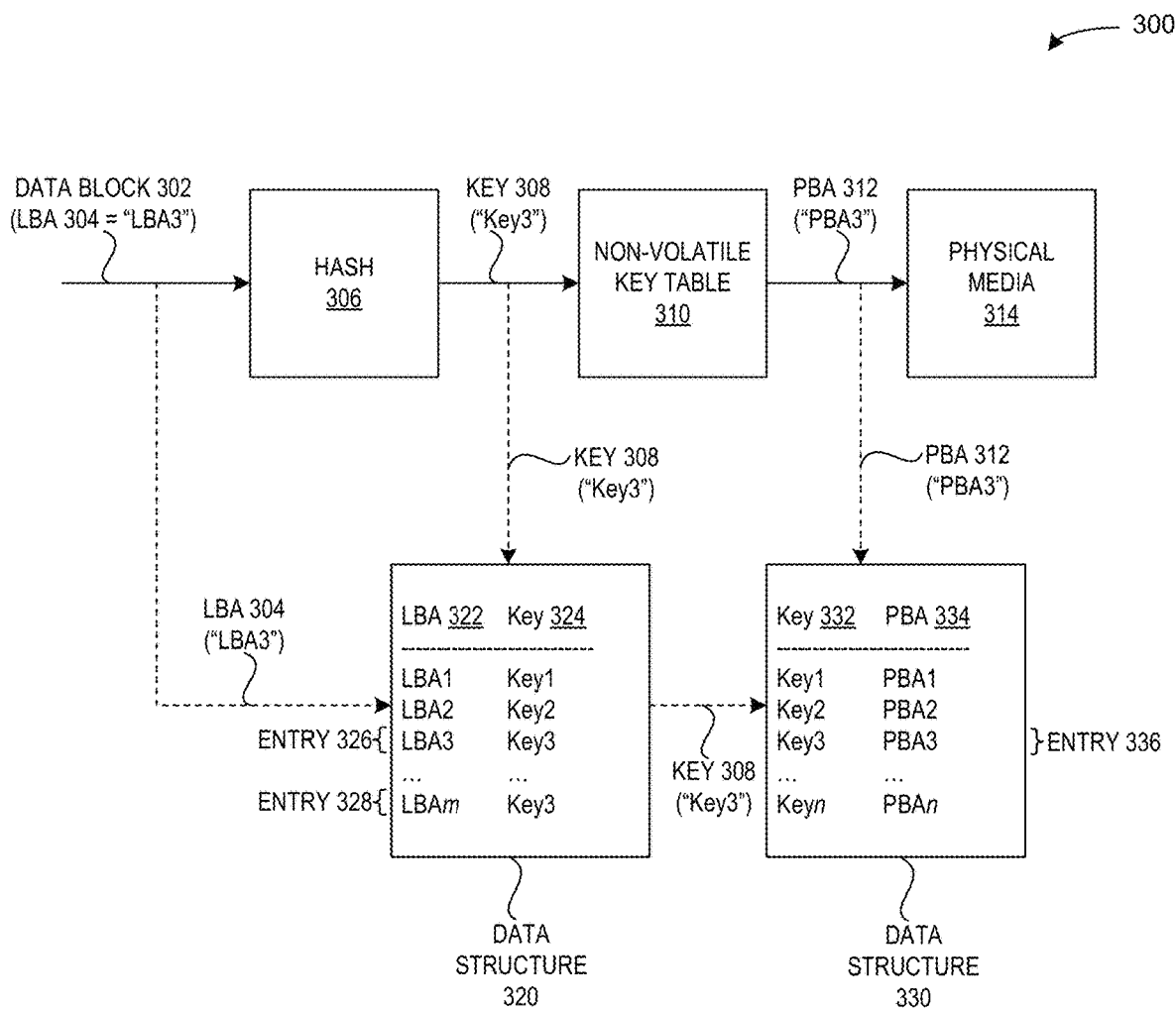
FIG. 3 illustrates an exemplary communication in addressing data blocks for facilitating in-line deduplication in a storage device, in accordance with an embodiment of the present application.

FIG. 3 illustrates an exemplary communication 300 in addressing data blocks for facilitating in-line deduplication in a storage device, in accordance with an embodiment of the present application. In communication 300, a hash 306 module can perform or compute a hash of data to obtain a key. The hash can be a non-collision algorithm which keeps the collision rate at a low rate (e.g., free of duplication or collisions). A non-volatile key table 310 can include a non-volatile memory which stores keys. A physical media 314 can include, e.g., a magnetic track and a NAND page. A data structure 320 can be a key table which stores a mapping between a logical block address (LBA) 322 and a key 324, where the LBA is used as the index for a key table. A data structure 330 can be a PBA table which stores a mapping between a key 332 and a physical block address (PBA) 334, where the key is used as the index for the PBA table.

During operation, the system can receive an incoming data block 302 with a logical block address (LBA) 304 which has a value of "LBA3." Hash 306 can perform a hash (e.g., SHA1 or SHA3) of data block 302 to obtain a key 308 which has a value of "Key3." The system can store key 308 in data structure 320 (i.e., the key table) based on LBA 304, as indicated in an entry 326 with a value of "{LBA3, Key3}." Key 308 can be subsequently used as the key to perform a search in data structure 330 (i.e., the PBA table). If the search returns a valid result (i.e., indicating that an entry for key 308 with a PBA already exists in data structure 330), the system can determine that the data corresponding to data block 302 has already been stored in the storage device, and that data block 302 is duplicate data. In this case, the system does not write the data to the physical storage. The system can instead simply modify metadata associated with the key and the LBA. For example, if the incoming data block has an LBA with a value of "LBAm" and hashes to "Key3," and the system determines that entry 336 for "Key3" already exists in data structure 330, the system can simply modify metadata associated with "LBAm" and "Key3." In some embodiments, the system can modify the metadata by adding an entry 328 to data structure 320 or by maintaining a count of the number of unique logical block addresses for each key in data structure 320.

If the search of data structure 330 returns an invalid result (i.e., indicating the an entry for key 308 does not already exist in data structure 330), the system can assign a new PBA 312 which has a value of "PBA3," and can store in data structure 330 a mapping of key 308 to PBA 312, as indicated in an entry 336 with a value of "{Key3, PBA3}." The system can subsequently write data block 302 to physical media 314 based on PBA 312. A flash translation layer (FTL) module of an SSD or a mapping system of an HDD can perform the assigning of the new PBA. The system can also process data block 302 prior to writing data block 302 to physical media 314, as described below in relation to FIG. 4.

The size of data structure 330 (i.e., the PBA table) is fixed based on the number of physical locations in a single drive. For instance, given a 4 TB drive with a 4 KB data block size, the PBA table can include $10^9$ entries. The depth of data structure 320 (i.e., the key table) remains the same as the number of incoming LBAs, where multiple LBAs may map to the same key (as shown in entries 326 and 328). The system can rely on the uniqueness of the PBA table, that is, a single PBA is assigned to each unique key.

Upon deleting a file (e.g., data stored in a NAND IC), the system can render the LBAs related to the file invalid. For example, the system can delete the entries in data structure 320 (i.e., the key table) which include the related LBAs as the index. By deleting these related LBAs, the system reduces the count of deduplicated LBAs for a given key (e.g., Key3). However, the corresponding entry in data structure 330 (i.e., the PBA table) for the given key (e.g., entry 336 for Key3) remains in the PBA table until the number of deduplicated LBAs in the key table for the given key reaches zero. For example, upon deleting a file with a related LBA of LBA3, the system can reduce the count of deduplicated LBAs for Key3 to a value of "1," but keep the corresponding entry 336 for Key3 in data structure 330 (i.e., the PBA table) until the count of deduplicated LBAs for Key3 in the key table reaches zero. By rendering an LBA invalid, the system can instantly release the LBA, while decoupling the release of the PBA until all associated LBAs for the PBA are deleted.

Thus, the embodiments described herein facilitate an efficient in-line deduplication in the storage device by using a two-step lookup, thereby eliminating the need to use a Bloom Filter or other computationally expensive search algorithm. This can result in an improved latency, write amplification, and overall efficiency for the system.

Exemplary Communication and Modules; Capacity Graph

Figure 4:
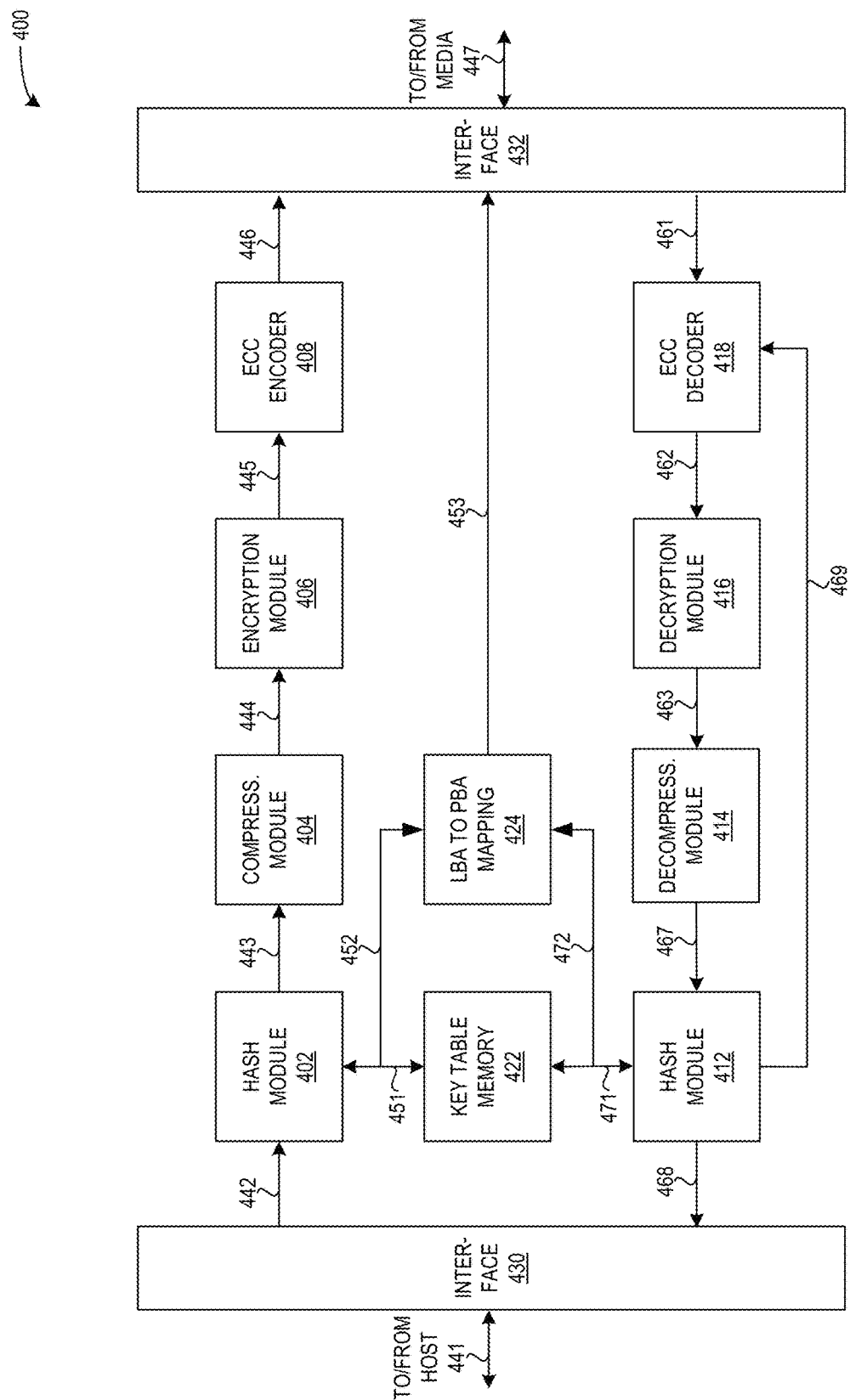
FIG. 4 depicts an exemplary environment for facilitating in-line deduplication in a storage device, in accordance with an embodiment of the present application.

FIG. 4 depicts an exemplary environment 400 for facilitating in-line deduplication in a storage device, in accordance with an embodiment of the present application. Environment 400 can include an interface 430, via which a controller may transmit and receive data packets (e.g., read/write requests, data, and data blocks) to and from a host (via a communication 441). Environment 400 can also include an interface 432, via which the controller may transmit and receive data packets to and from physical media of a storage device (via a communication 447).

During operation, a controller can receive, via interface 430, data to be stored (e.g., a write operation). A hash module 402 can receive the data in a communication 442, and transmit a hash of the data (e.g., the key) for storage in a key table memory 422 in a communication 451. Key table memory 422 can correspond to data structure 320 of FIG. 3, i.e., can include a mapping of LBAs to keys. The controller can also transmit the key in a communication 452 to an LBA to PBA mapping 424, and can perform a search for an entry with a valid PBA based on the key. LBA to PBA mapping 424 can correspond to data structure 330 of FIG. 3, i.e., can include a mapping of keys to PBAs. If no valid entry is found, the controller can write the data to the physical media in a communication 453 via interface 432. If a valid entry is found, the controller can simply modify metadata associated with the key and the LBA, as described above in relation to FIG. 3.

If the controller determines that no valid entry is found in LBA to PBA mapping 424, the controller can also process the data prior to writing the data to the physical media. For example, the controller can transmit the key and the data in a communication 443 to a compression module 404, which can compress the data. Compression module 404 can send the compressed data and the key in a communication 444 to an encryption module 406, which can encrypt the compressed data based on the key. Encryption module 406 can send the encrypted data in a communication 445 to an ECC encoder 408, which can encode the encrypted data based on an error correction code. ECC encoder 408 can send the encoded data in a communication 446 to the physical media via interface 432.

The system can also receive, via interface 430, a request to read data (e.g., a read operation). The controller can obtain the requested data via interface 432 from the physical media, and send the obtained data in a communication 461 to an ECC decoder 418, which can decode the obtained data based on the error correction code. ECC decoder 418 can send the decoded data in a communication 462 to a decryption module 416, which decrypts the decoded data based on the key (which can be obtained from key table memory 422). Decryption module 416 can send the decrypted data in a communication 463 to a decompression module 414, which can decompress the decrypted data. Decompression module 414 can send the decompressed data in a communication 467 to a hash module 412 (which can perform a similar hash as hash module 402). Hash module 412 can calculate a hash of the decompressed data, and compare the calculated hash with the key. If the calculated hash does not match the key, the controller can generate an error report or a message, and can also notify ECC decoder 418 in a communication 469 to iterate through the decoding process. If the calculated hash does match the key, the controller can return the read data in a communication 468 to a requesting application via interface 430.

Compressing the data (e.g., by compression module 404) may reduce the local redundancy. Compressing the data does not increase the total number of PBAs, but may reduce the amount of data written to the physical media, which can mitigate the write amplification. Furthermore, the system can use the hash key for data deduplication (e.g., as described above) as well as for ensuring data consistency in a read operation. That is, hash modules 402 and 412 can perform functionality similar to that of a cyclic redundancy check, thereby providing a more streamlined and efficient process for completing I/O operations in a storage drive.

Figure 5:
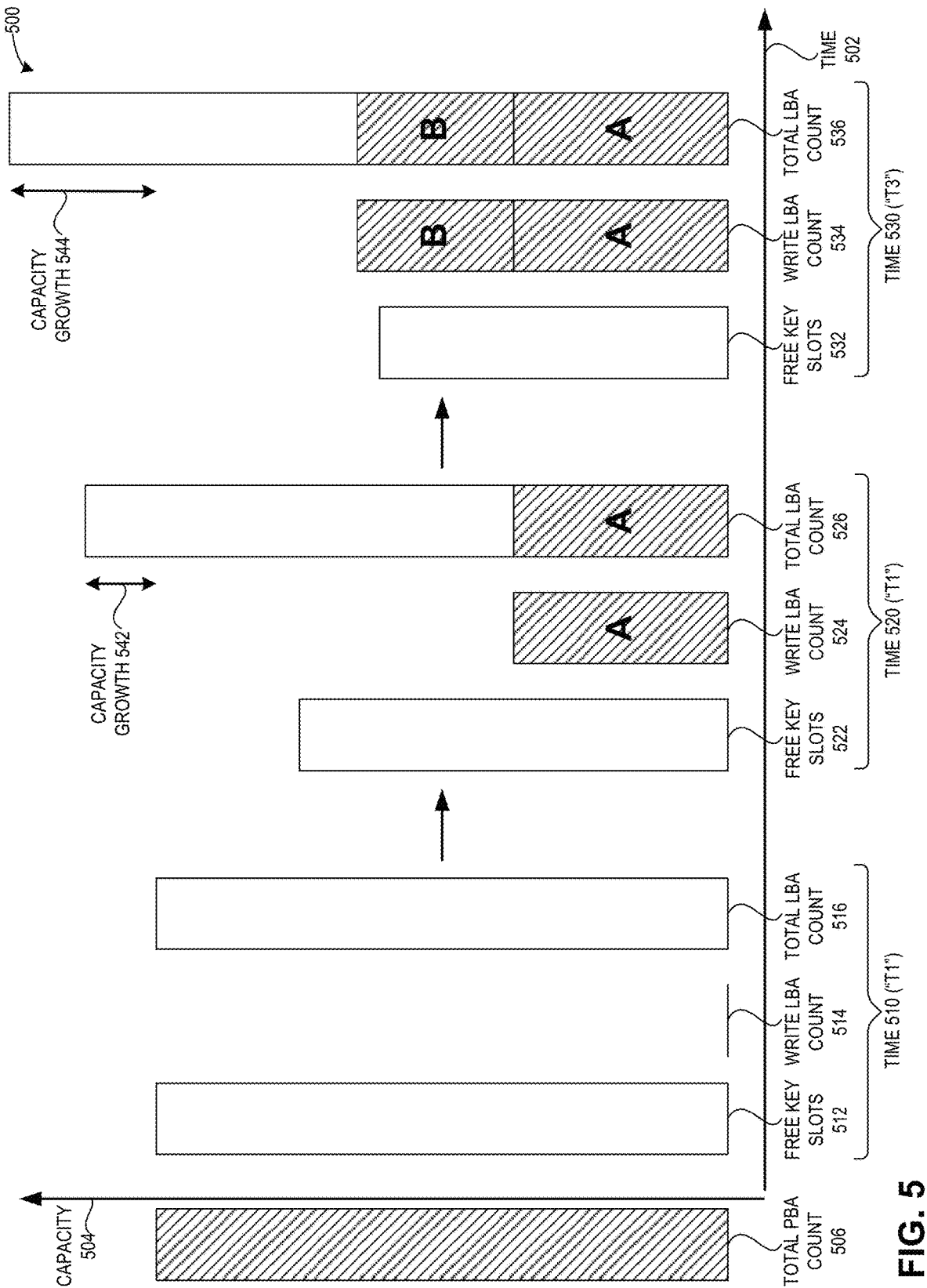
FIG. 5 illustrates an exemplary graph of a capacity of a storage drive which facilitates in-line deduplication, in accordance with an embodiment of the present application.

FIG. 5 illustrates an exemplary graph 500 of a capacity of a storage drive which facilitates in-line deduplication, in accordance with an embodiment of the present application. Graph 500 includes an x-axis of a time 502 and a y-axis of a capacity 504. The capacity of the storage drive is depicted based on a total PBA count 506. At a time 510 ("T1"), graph 500 indicates a free key slots 512, a write LBA count 514, and a total LBA count 516. At a time 520 ("T2"), graph 500 indicates a free key slots 522 (which has a decreased capacity since time T1), a write LBA count 524 of "A" (which has an increased capacity since time T1), and a total LBA count 526 which includes write LBA count 524 (i.e., A) and free key slots 522. Furthermore, at time T2, a capacity growth 542 is indicated.

At a time 530 ("T3"), graph 500 indicates a free key slots 532 (which has a decreased capacity since time T2), a write LBA count 534 of "A" and "B" (which has an increased capacity since time T2), and a total LBA count 536 which includes write LBA count 534 (i.e., A and B) and free key slots 532. Furthermore, at time T2, a capacity growth 544 is indicated.

Thus, graph 500 illustrates how a storage drive's capacity (which is measured conventionally based on the total LBA count) may increase based on the deduplication ratio. During operation, because of the duplicated blocks, the number of actual blocks stored in the physical media (e.g., occupied PBAs) is less than the total number of incoming blocks (e.g., corresponding LBAs). The free key slots (e.g., 512, 522, and 532) are equivalent to the physical locations (e.g., PBAs), which decrease as more unique blocks are written to the physical media. Thus, at any given time, the total capacity of the storage drive (e.g., 516, 526, and 536) is the sum of the currently free key slots (e.g., 512, 522, and 532, respectively) and the already written LBAs (e.g., 514, 524, and 534, respectively). The number of already written LBAs increases as long as one LBA is acknowledged to the host, regardless of whether the corresponding data is physical written or deduplicated. Thus, graph 500 shows the incremental capacity based on the difference between capacity growth 532 at time T2 and capacity growth 534 at time T3. The storage drive can guarantee a certain capacity, and can provide additional capacity based on the data pattern and the deduplication ratio.

Thus, the embodiments described herein provide a system which reduces the actual amount of data written into a storage drive, which creates additional capacity for processing more LBAs and also reduces the wear-out of the physical media. The reduction of the wear-out is a significant improvement for an SSD, which typically has a lower value for available program-erase (P/E) cycles than an HDD. Reducing the redundant data written to a storage drive (i.e., deduplication) can thus improve the lifetime of the storage device, and can also reduce the power consumption and the performance degradation of the storage device.

Exemplary Communication During a Write Operation

Figure 6:
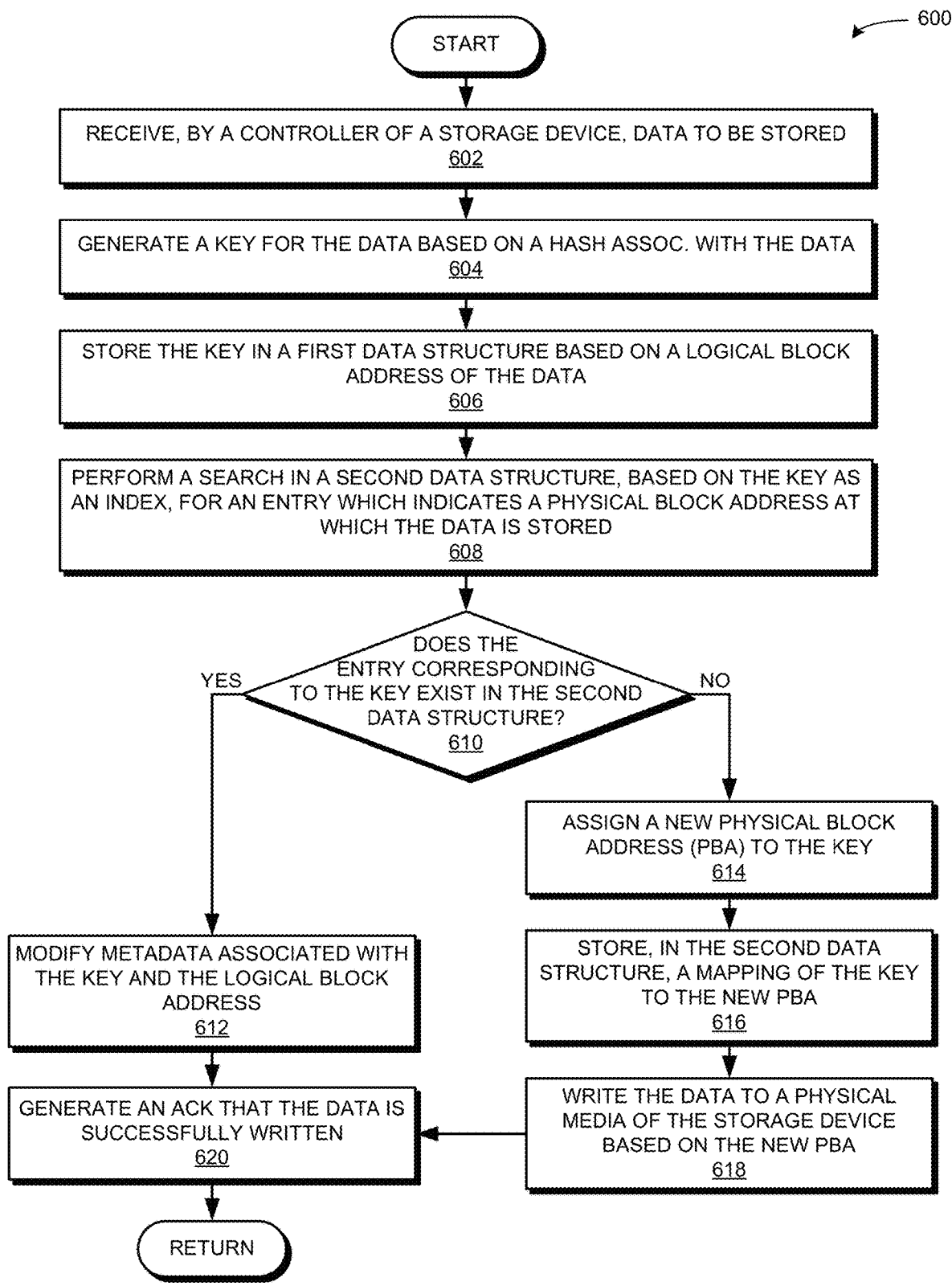
FIG. 6 presents a flowchart illustrating a method for writing data, in accordance with an embodiment of the present application.

FIG. 6 presents a flowchart illustrating a method 600 for writing data, in accordance with an embodiment of the present application. During operation, the system receives, by a controller of a storage device, data to be stored (operation 602). The system generates a key for the data based on a hash associated with the data (operation 604). The system stores the key in a first data structure based on a logical block address of the data (operation 606). The system performs a search in a second data structure, based on the key as an index, for an entry which indicates a physical block address at which the data is stored (operation 608). If the entry corresponding to the key exists in the second data structure (decision 610), the system modifies metadata associated with the key and the logical block address (operation 612). The system can accumulate the statistics of deduplication, e.g., by tracking the repeat counts of unique blocks using metadata associated with the duplicate blocks. The system generates an acknowledgment (or other indication) that the data is successfully written to the storage device (operation 620).

If the entry corresponding to the key does not exist in the second data structure (decision 610), the system assigns a new physical block address (PBA) to the key (operation 614). The system stores, in the second data structure, a mapping of the key to the new PBA (operation 616). The system writes the data to a physical media of the storage device based on the new PBA (operation 618). Subsequently, the system generates an acknowledgment (or other indication) that the data is successfully written to the storage device (operation 620).

Exemplary Communication During a Read Operation

Figure 7:
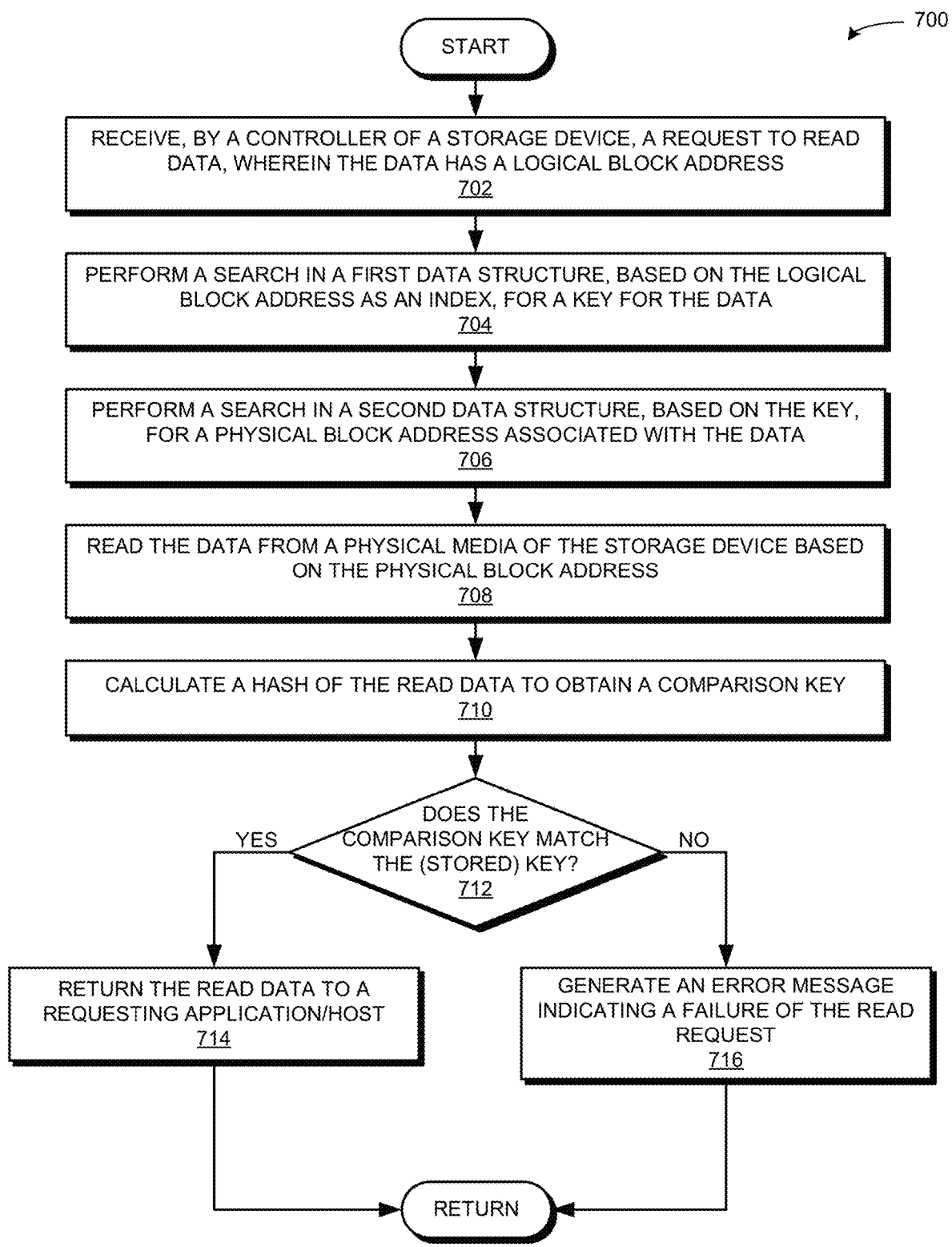
FIG. 7 presents a flowchart illustrating a method for reading data, in accordance with an embodiment of the present application.

FIG. 7 presents a flowchart 700 illustrating a method for reading data, in accordance with an embodiment of the present application. During operation, the system receives, by a controller of the storage device, a request to read data, wherein the data has a logical block address (operation 702). The system performs a search in a first data structure, based on the logical block address as an index, for a key for the data (operation 704). The system performs a search in a second data structure, based on the key, for a physical block address associated with the data (operation 706). The system reads the data from a physical media of the storage device based on the physical block address (operation 708). The system calculates a hash of the read data to obtain a comparison key (operation 710). If the comparison key matches the (stored) key (decision 712), the system returns the read data to a requesting application or host (operation 714). If the comparison key does not match the (stored) key (decision 712), the system generates an error message indicating a failure of the read request (operation 716). In some embodiments, the system can notify an ECC decoder to repeat the decoding process, as described above in relation to FIG. 4.

Exemplary Computer System and Apparatus

Figure 8:
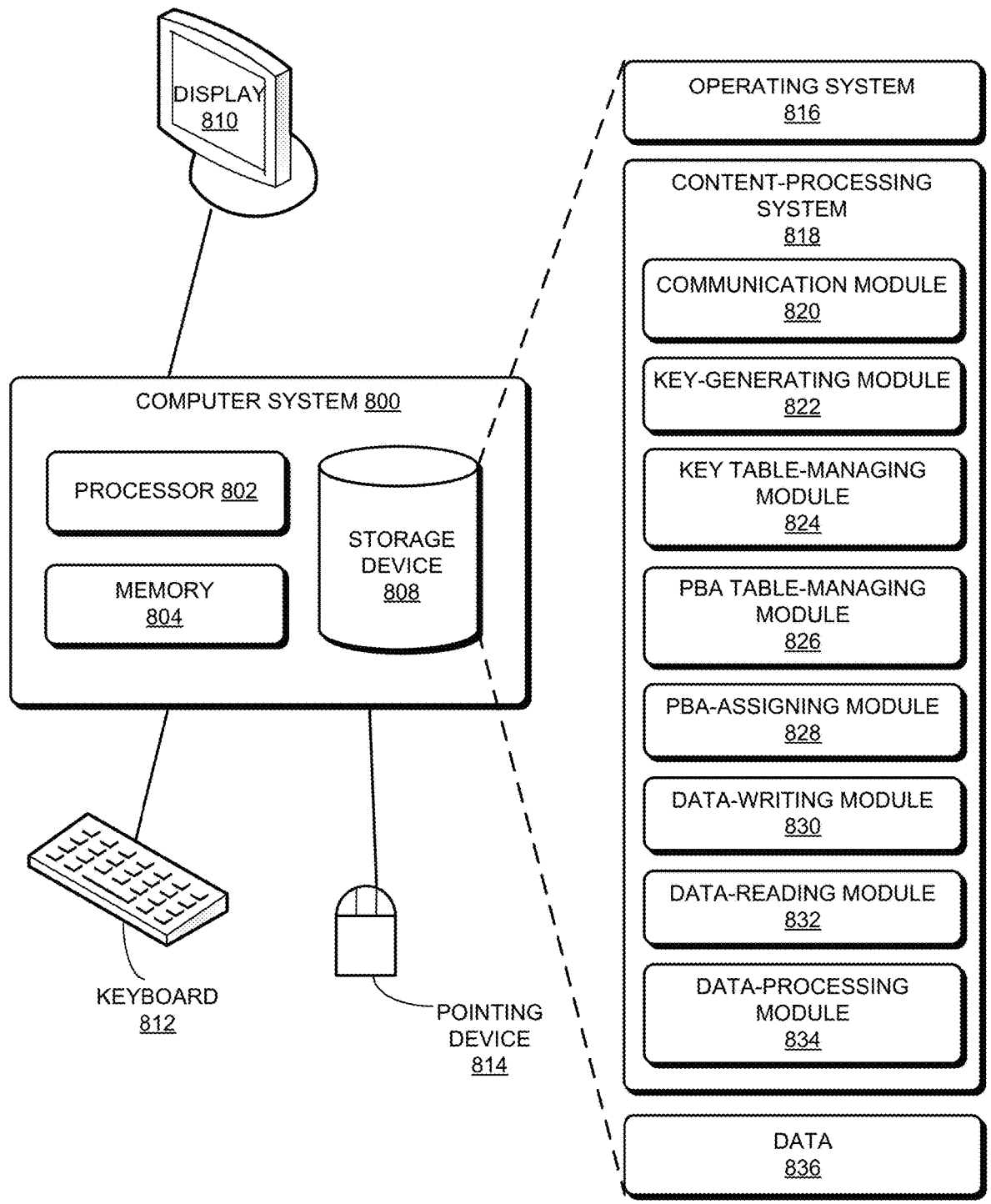
FIG. 8 illustrates an exemplary computer system that facilitates in-line deduplication in a storage device, in accordance with an embodiment of the present application.

FIG. 8 illustrates an exemplary computer system 800 that facilitates in-line deduplication in a storage device, in accordance with an embodiment of the present application. Computer system 800 includes a processor 802, a memory 804, and a storage device 808. Computer system 800 may be a client-serving machine. Memory 804 can include a volatile memory (e.g., RAM) that serves as a managed memory, and can be used to store one or more memory pools. Furthermore, computer system 800 can be coupled to a display device 810, a keyboard 812, and a pointing device 814. Storage device 808 can store an operating system 816, a content-processing system 818, and data 836.

Content-processing system 818 can include instructions, which when executed by computer system 800, can cause computer system 800 to perform methods and/or processes described in this disclosure. Specifically, content-processing system 818 can include instructions for receiving and transmitting data packets, including a request to write or read data, data to be encoded and stored, a block of data, a key, a logical block address, or a physical block address. Content-processing system 818 can further include instructions for receiving, by a controller of a storage device, data to be stored (communication module 820). Content-processing system 818 can also include instructions for generating a key for the data based on a hash associated with the data (key-generating module 822). Content-processing system 818 can include instructions for storing the key in a first data structure based on a logical block address of the data (key table-managing module 824). Content-processing system 818 can further include instructions for, in response to determining that an entry corresponding to the key exists in a second data structure (PBA table-managing module 826), modifying metadata associated with the key and the logical block address (key table-managing module 824).

Content-processing system 818 can also include instructions for, in response to determining that an entry corresponding to the key does not exist in the second data structure (PBA table-managing module 826): assigning a new physical block address to the key (PBA-assigning module 828); storing, in the second data structure, a mapping of the key to the new physical block address (PBA table-managing module 826); and writing the data to a physical media of the storage device based on the new physical block address (data-writing module 830). Content-processing system 818 can additionally include instructions for processing the data (including compressing/decompressing data; encrypting/decrypting data; and encoding/decoding data) (data-processing module 834).

Furthermore, content-processing system 818 can include instructions for receiving, by the controller, a request to read the data (communication module 820). Content-processing system 818 can include instructions for performing a search in the first data structure, based on the logical block address, for the key (key table-managing module 824). Content-processing system 818 can include instructions for performing a search in the second data structure, based on the key, for the physical block address associated with the data (PBA table-managing module 826). Content-processing system 818 can include instructions for reading the data from the storage device based on the physical block address (data-reading module 832). Content-processing system 818 can include instructions for, in response to determining that a hash of the read data does not match the key (data-processing module 834), generating an error report or message (data-processing module 834). Content-processing system 818 can include instructions for, in response to determining that the hash of the read data does match the key (data-processing module 834), returning the read data to a requesting application (communication module 820).

Data 836 can include any data that is required as input or that is generated as output by the methods and/or processes described in this disclosure. Specifically, data 836 can store at least: data to be stored, deduplicated, or processed; a hash of data; a hash associated with data; a key; a key which is a hash of data; processed or stored data; encoded or decoded data; encrypted or decrypted data; compressed or decompressed data; a sub-block of data; an error correction code (ECC) encoding or decoding; a logical block address (LBA); a physical block address (PBA); a first data structure mapping LBAs to keys; a second data structure mapping keys to PBAs; an entry; an index; an indicator of a physical media of a storage device; a flash translation layer module; a mapping system; a request to read, write, access, delete, process, or manipulate data; and a result of a comparison of two keys.

Figure 9:
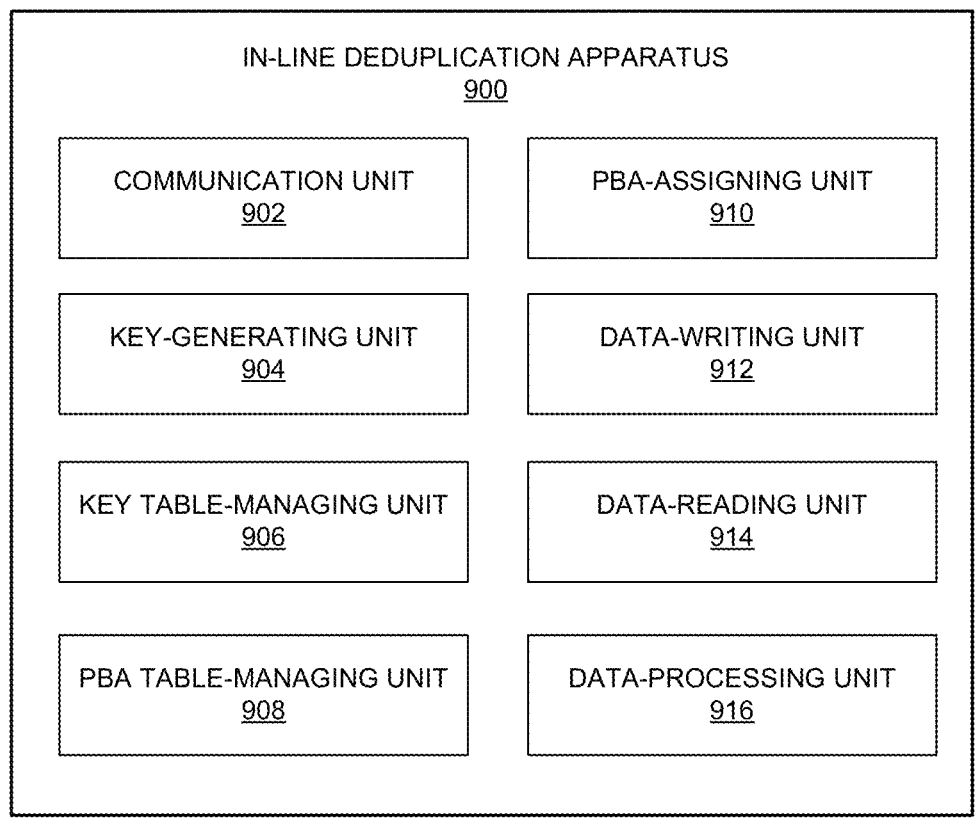
FIG. 9 illustrates an exemplary apparatus that facilitates in-line deduplication in a storage device, in accordance with an embodiment of the present application.

FIG. 9 illustrates an exemplary apparatus 900 that facilitates in-line deduplication in a storage device, in accordance with an embodiment of the present application. Apparatus 900 can comprise a plurality of units or apparatuses which may communicate with one another via a wired, wireless, quantum light, or electrical communication channel. Apparatus 900 may be realized using one or more integrated circuits, and may include fewer or more units or apparatuses than those shown in FIG. 9. Further, apparatus 900 may be integrated in a computer system, or realized as a separate device which is capable of communicating with other computer systems and/or devices. Specifically, apparatus 900 can comprise units 902-916 which perform functions or operations similar to modules 820-834 of computer system 800 of FIG. 8, including: a communication unit 902; a key-generating unit 904; a key table-managing unit 906; a PBA table-managing unit 908; a PBA-assigning unit 910; a data-writing unit 912; a data-reading unit 914; and a data-processing unit 916.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating in-line deduplication in a storage device, the method comprising:
   receiving, by a controller of the storage device, data to be stored;
   generating a key for the data based on a hash associated with the data;
   storing the key in a first data structure based on a logical block address of the data;
   in response to determining that an entry corresponding to the key exists in a second data structure, wherein the entry indicates a physical block address at which the data is stored, modifying metadata associated with the key and the logical block address; and
   in response to determining that an entry corresponding to the key does not exist in the second data structure:
      compressing the data;
      encrypting the compressed data based on the key;
      encoding the encrypted data based on an error correction code; and
      writing the encoded data to a physical media of the storage device based on a new physical block address.

2. The method of claim 1, wherein determining that the entry corresponding to the key exists in the second data structure involves:
   performing a search in the second data structure, based on the key as an index, for the entry which indicates the physical block address at which the data is stored.

3. The method of claim 1, wherein in response to determining that the entry corresponding to the key does not exist in the second data structure, prior to writing the encoded data to the physical media of the storage device, the method further comprises:
   assigning the new physical block address to the key; and
   storing, in the second data structure, a mapping of the key to the new physical block address.

4. The method of claim 3, wherein assigning the new physical block address is performed by one or more of:
   a flash translation layer module of the storage device; and
   a mapping system of the storage device.

5. The method of claim 1, wherein entries in the first data structure are indexed by logical block addresses,
   wherein a respective entry in the first data structure indicates a corresponding key,
   wherein entries in the second data structure are indexed by keys, and
   wherein a respective entry in the second data structure indicates a corresponding physical block address.

6. The method of claim 1, further comprising:
   receiving, by the controller, a request to read the data;
   performing a search in the first data structure, based on the logical block address, for the key;
   performing a search in the second data structure, based on the key, for the physical block address associated with the data;
   reading the data from the storage device based on the physical block address;
   in response to determining that a hash of the read data does not match the key, generating an error report or message; and
   in response to determining that the hash of the read data does match the key, returning the read data to a requesting application.

7. The method of claim 6, wherein subsequent to reading the data from the storage device based on the physical block address, the method further comprises:
   processing the data by:
      decoding the read data based on an error correction code;
      decrypting the decoded data based on the key; and
      decompressing the decrypted data.

8. The method of claim 1, wherein the first data structure is stored in a first non-volatile memory of the storage device, and
   wherein the second data structure is stored in a second non-volatile memory of the storage device and loaded into a volatile memory of the storage device.

9. A computer system for facilitating in-line deduplication, the system comprising:
   a processor; and
   a memory coupled to the processor and storing instructions, which when executed by the processor cause the processor to perform a method, wherein the computer system is a storage device, the method comprising:
   receiving, by a controller of the storage device, data to be stored;
   generating a key for the data based on a hash associated with the data;
   storing the key in a first data structure based on a logical block address of the data;
   in response to determining that an entry corresponding to the key exists in a second data structure, wherein the entry indicates a physical block address at which the data is stored, modifying metadata associated with the key and the logical block address; and
   in response to determining that an entry corresponding to the key does not exist in the second data structure:
      compressing the data;
      encrypting the compressed data based on the key;

encoding the encrypted data based on an error correction code; and writing the encoded data to a physical media of the storage device based on a new physical block address.

10. The computer system of claim 9, wherein determining that the entry corresponding to the key exists in the second data structure involves:

performing a search in the second data structure, based on the key as an index, for the entry which indicates the physical block address at which the data is stored.

11. The computer system of claim 9, wherein in response to determining that the entry corresponding to the key does not exist in the second data structure, prior to writing the encoded data to the physical media of the storage device, the method further comprises:

assigning the new physical block address to the key; and
storing, in the second data structure, a mapping of the key to the new physical block address.

12. The computer system of claim 11, wherein assigning the new physical block address is performed by one or more of:

a flash translation layer module of the storage device; and
a mapping system of the storage device.

13. The computer system of claim 9, wherein entries in the first data structure are indexed by logical block addresses, wherein a respective entry in the first data structure indicates a corresponding key,
wherein entries in the second data structure are indexed by keys, and
wherein a respective entry in the second data structure indicates a corresponding physical block address.

14. The computer system of claim 9, wherein the method further comprises:

receiving, by the controller, a request to read the data;
performing a search in the first data structure, based on the logical block address, for the key;
performing a search in the second data structure, based on the key, for the physical block address associated with the data;
reading the data from the storage device based on the physical block address;
in response to determining that a hash of the read data does not match the key, generating an error report or message; and
in response to determining that the hash of the read data does match the key, returning the read data to a requesting application.

15. The computer system of claim 14, wherein subsequent to reading the data from the storage device based on the physical block address, the method further comprises:

processing the data by:
decoding the read data based on an error correction code;
decrypting the decoded data based on the key; and
decompressing the decrypted data.

16. The computer system of claim 9, wherein the first data structure is stored in a first non-volatile memory of the storage device, and wherein the second data structure is stored in a second non-volatile memory of the storage device and loaded into a volatile memory of the storage device.

17. A storage device for facilitating in-line deduplication, comprising:

a first non-volatile memory which stores a first data structure;
a second non-volatile memory which stores a second data structure which is loaded into a volatile memory; and
a controller configured to:
receive data to be stored;
generate a key for the data based on a hash associated with the data;
store the key in the first data structure based on a logical block address of the data;
in response to determining that an entry corresponding to the key exists in the second data structure, wherein the entry indicates a physical block address at which the data is stored, modify metadata associated with the key and the logical block address; and
in response to determining that an entry corresponding to the key does not exist in the second data structure:
compress the data;
encrypt the compressed data based on the key;
encode the encrypted data based on an error correction code; and
write the encoded data to a physical media of the storage device based on a new physical block address.

18. The storage device of claim 17, wherein in response to determining that the entry corresponding to the key does not exist in the second data structure, prior to writing the encoded data to the physical media of the storage device, the controller is further configured to:

assign the new physical block address to the key; and
store, in the second data structure, a mapping of the key to the new physical block address.

* * * * *